United States Patent
Park et al.

(10) Patent No.: US 7,663,702 B2
(45) Date of Patent: Feb. 16, 2010

(54) DIGITAL VIDEO SIGNAL PROCESSING APPARATUS AND METHOD FOR ADAPTIVE TEMPORAL AND SPATIAL Y/C SEPARATION IN MULTIPLE DIRECTIONS

(75) Inventors: Sung-cheol Park, Seoul (KR);
Kyoung-mook Lim, Hwaseong-si (KR);
Hyung-jun Lim, Suwon-si (KR);
Seh-woong Jeong, Seoul (KR);
Jae-hong Park, Seongnam-si (KR);
Heo-jin Byeon, Hwaseong-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 792 days.

(21) Appl. No.: 11/331,359

(22) Filed: Jan. 13, 2006

(65) Prior Publication Data

US 2006/0197876 A1    Sep. 7, 2006

(30) Foreign Application Priority Data

Jan. 13, 2005    (KR) ................ 10-2005-0003179

(51) Int. Cl.
*H04N 9/77* (2006.01)
*H04N 9/78* (2006.01)

(52) U.S. Cl. .................. 348/663; 348/665; 348/667; 348/670

(58) Field of Classification Search .......... 348/663, 348/664, 665, 667, 669, 670
See application file for complete search history.

(56) References Cited

U.S. PATENT DOCUMENTS

| | | | |
|---|---|---|---|
| 5,398,066 A * | 3/1995 | Martinez-Uriegas et al. | 375/240.25 |
| 5,473,389 A * | 12/1995 | Eto et al. | 348/669 |
| 5,541,669 A * | 7/1996 | Yamaguchi et al. | 348/669 |
| 5,585,861 A * | 12/1996 | Taniguchi et al. | 348/669 |
| 5,686,972 A * | 11/1997 | Kim | 348/663 |
| 5,909,255 A * | 6/1999 | Hatano | 348/663 |
| 5,990,978 A * | 11/1999 | Kim et al. | 348/663 |
| 6,055,024 A * | 4/2000 | DiMeo et al. | 348/668 |
| 6,288,754 B1 * | 9/2001 | Ito | 348/663 |
| 6,300,985 B1 * | 10/2001 | Lowe et al. | 348/665 |
| 6,674,488 B1 * | 1/2004 | Satoh | 348/663 |
| 6,774,954 B1 * | 8/2004 | Lee | 348/665 |
| 6,795,126 B1 * | 9/2004 | Lee | 348/663 |
| 6,809,778 B2 * | 10/2004 | Shibutani et al. | 348/667 |

(Continued)

FOREIGN PATENT DOCUMENTS

JP          60-062292          4/1985

(Continued)

*Primary Examiner*—Brian P Yenke
(74) *Attorney, Agent, or Firm*—Lee & Morse, P.C.

(57) ABSTRACT

A digital video signal processing apparatus and method for adaptive spatio-temporal Y/C separation in multiple directions. In the digital video signal processing apparatus, an adaptive three-dimensional band pass filter (3D BPF) performs Y/C separation using local comb filtering/1D band pass filtering when the edge direction is fixed vertically/horizontally according to spatio-temporal local characteristics of an image using spatio-temporal filters. When the edge direction is not fixed horizontally/vertically, the 3D BPF performs 2D band pass filtering in all directions. Thus, the 3D BPF continuously carries out comb filtering, 1D band pass filtering and 2D band pass filtering according to the spatio-temporal local characteristics of the image.

20 Claims, 13 Drawing Sheets

U.S. PATENT DOCUMENTS

| | | | |
|---|---|---|---|
| 6,914,638 B2 * | 7/2005 | Tsui | 348/663 |
| 6,956,620 B2 * | 10/2005 | Na | 348/663 |
| 6,970,597 B1 * | 11/2005 | Olding et al. | 382/167 |
| 7,046,306 B2 * | 5/2006 | Zhai et al. | 348/666 |
| 7,133,080 B2 * | 11/2006 | Kobayashi et al. | 348/663 |
| 7,176,984 B2 * | 2/2007 | Wu | 348/663 |
| 7,196,736 B2 * | 3/2007 | Ogawa | 348/670 |
| 7,227,587 B2 * | 6/2007 | MacInnis et al. | 348/667 |
| 7,274,408 B2 * | 9/2007 | Shan et al. | 348/669 |
| 7,304,688 B1 * | 12/2007 | Woodall | 348/663 |
| 7,324,163 B2 * | 1/2008 | Bacche | 348/663 |
| 7,405,740 B1 * | 7/2008 | Neugebauer | 345/667 |
| 7,420,624 B2 * | 9/2008 | Lin et al. | 348/663 |
| 7,453,525 B2 * | 11/2008 | Renner et al. | 348/702 |
| 2002/0008785 A1 | 1/2002 | Yamaguchi et al. | |
| 2004/0174464 A1 * | 9/2004 | MacInnis et al. | 348/667 |
| 2004/0201781 A1 * | 10/2004 | Kobayashi et al. | 348/663 |
| 2006/0077302 A1 * | 4/2006 | Nieuwenhuizen | 348/665 |
| 2006/0188154 A1 * | 8/2006 | Park et al. | 382/167 |
| 2007/0153127 A1 * | 7/2007 | MacInnis et al. | 348/667 |

FOREIGN PATENT DOCUMENTS

| | | |
|---|---|---|
| JP | 61-274491 | 12/1986 |
| KR | 1996-006660 | 12/1996 |
| KR | 1996-028597 | 8/1997 |
| KR | 1996-003454 | 7/1998 |

* cited by examiner

FIG. 4

| +u | +v | −u | −v | +u |
|---|---|---|---|---|
| −u | −v | +u | +v | −u |
| +u | +v | −u | −v | +u |

FIG. 5

| +u | −v | −u | +v | +u |
|---|---|---|---|---|
| +v | −u | −v | +u | +v |
| −u | +v | +u | −v | −u |
| −v | +u | +v | −u | −v |
| +u | −v | −u | +v | +u |

DIGITAL VIDEO SIGNAL PROCESSING APPARATUS AND METHOD FOR ADAPTIVE TEMPORAL AND SPATIAL Y/C SEPARATION IN MULTIPLE DIRECTIONS

BACKGROUND OF THE INVENTION

1. Field of the Invention

The present invention relates to a digital video signal processing apparatus. More particularly, the present invention relates to a digital video signal processing apparatus and method for field/frame based temporal and spatial Y/C separation in multiple directions in NTSC/PAL (National Television System Committee/Phase Alternation by Line) systems.

2. Description of the Related Art

The display of an NTSC/PAL broadcasting system includes a device for processing a CVBS (Composite Video Blanking Sync) signal, which is a composite of a Y (luminance) signal and a C (chrominance) signal. The C signal is quadrature-amplitude-modulated with a subcarrier frequency fsc. Thus, characteristics of the C signal are determined by its frequency and phase. A digital video signal processing apparatus at a receiving stage separates Y and C signals with reference to the characteristic of the C signal and displays an image based on the separated signals.

FIG. 1 illustrates a block diagram of a conventional video signal processing apparatus 100. Referring to FIG. 1, the video signal processing apparatus 100 includes a comb filter 110, a one-dimensional bandpass filter (1D-BPF) 120, a weight determination unit 130, a combiner 140 and a subtracter 150. The comb filter 110 one-dimensionally band-pass-filters an input video signal in the vertical direction. The 1D-BPF 120 one-dimensionally band-pass-filters the input video signal in the horizontal direction. The weight determination unit 130 determines weights of the output of the comb filter 110 and the output of the 1D-BPF 120 with reference to vertical/horizontal correlation and the phase of a C signal. The combiner 140 combines the output signals of the comb filter 110 and 1D-BPF 120 using the weights to generate a C signal. The subtracter 150 subtracts the C signal from the input CVBS signal to generate a Y signal.

FIG. 2 illustrates a block diagram of another conventional video signal processing apparatus 200. Referring to FIG. 2, the video signal processing apparatus 200 includes a 2D-BPF 210, a subtracter 220 and a post-processor 230. The 2D-BPF 210 performs a two-dimensional convolution to extract a modulated C signal. The extracted C signal and a Y signal generated by the subtracter 220 are processed by the post-processor 230. When the 2D-BPF 210 carries out Y/C separation incorrectly, the post-processor 230 compensates the Y/C signal to generate a compensated Y/C signal.

In conventional Y/C separation techniques, when the edge of a detected image has high vertical correlation, Y/C separation is performed based on comb filtering and when the edge of a detected image has high horizontal correlation, Y/C separation is performed based on 1D bandpass filtering. As described above, when selecting one of these filtering methods according to a conventional Y/C separation technique, system performance largely depends on a threshold used for edge detection. That is, Y/C separation can be executed incorrectly or unstably when the filtering method is wrongly selected due to inaccurate edge detection. Conventional techniques that do not select one of the filtering methods but combine the results of the filtering operations can solve this problem to some extent. However, these techniques are based on horizontal or vertical one-dimensional filtering, and thus, artifacts may remain in the generated signal due to the inconstant edge directions.

In other words, in the case where the direction in which the edge of an image extends is not uniform, cross-luma, which occurs when a C component exists in the separated Y signal, resulting in dotted artifacts, and cross-color, which occurs when a Y component exists in the separated C signal, resulting in a rainbow pattern artifact, can appear on a displayed image when Y/C separation is not properly performed by comb filtering or 1D bandpass filtering selected discretely.

To improve spatial filtering, spatio-temporal filtering is used by conventional video signal processing apparatuses. In this case, when processing a current pixel, the correlations of pixel data of the previous field and pixel data of the next field with the current pixel or the correlations of pixel data of the previous frame and pixel data of the next frame with the current pixel is considered. The spatio-temporal filtering method requires a memory for storing the pixel data of the previous and next fields or frames. Although the spatio-temporal filter is more expensive than the spatial filter, the spatio-temporal filtering technique is frequently used when images with high picture quality are required.

However, conventional Y/C separation techniques, which discretely select the spatial filter and the spatio-temporal filter in response to an inter-frame/intra-frame correlation of the CVBS signal, generate artifacts such as cross-luma and cross-color when there is an error in the correlation measurement. In addition, the conventional techniques have limitations in two-dimensional spatial Y/C separation.

SUMMARY OF THE INVENTION

The present invention is therefore directed to a digital video signal processing apparatus and method, which substantially overcome one or more of the problems due to the limitations and disadvantages of the related art.

It is a feature of an embodiment of the present invention to provide a digital video signal processing apparatus used for both NTSC and PAL systems.

It is a feature of an embodiment of the present invention to adaptively and continuously perform field/frame-based Y/C separation in multiple directions according to temporal and spatial characteristics of an input video signal.

It is yet another feature of an embodiment of the present invention to use a spatio-temporal filter having spectral characteristics suitable for Y/C separation of the input video signal.

At least one of the above and other features and advantages of the present invention may be realized by providing a video signal processing method, including generating a plurality of plane coefficients and combination coefficients using digital data corresponding to a plurality of fields of an input video signal, convoluting filter masks composed of the plane coefficients with corresponding data windows of the input video signal to produce a first chrominance signal $C_1$, a second chrominance signal $C_2$ and a third chrominance signal $C_3$ and combining the first, second and third chrominance signals $C_1$-$C_3$ using the combination coefficients to generate a C signal of the input video signal.

The C signal may be subtracted from the input video signal to obtain a Y signal of the input video signal.

The convoluting may include adaptively generating filter masks in a continuous manner according to spatio-temporal local characteristics of the input video signal.

The convoluting may include local vertical comb filtering when the local characteristics of the input video signal indicate high vertical correlation, local horizontal band pass filtering when the local characteristics of the input video signal indicate high horizontal correlation and 2D band pass filtering when the local characteristics of the input video signal indicate high or low correlation in both the horizontal and vertical directions with reference to at least five field data.

The convoluting may include convoluting a first filter mask composed of a combination of first plane coefficients with a first data window to produce the first chrominance signal $C_1$, convoluting a second filter mask composed of a combination of second plane coefficients with a second data window to produce the second chrominance signal $C_2$ and convoluting a third filter mask composed of a combination of third plane coefficients with a third data window to produce the third chrominance signal $C_3$.

The first data window may include digital data of at least three horizontal scan lines of a current field. The second data window may include digital data of a horizontal scan line of each of a previous field, the current field and a next field. The third data window may include digital data of a horizontal scan line of each of a field two fields prior to the current field, the current field and a field two fields after the current field. Each of the first, second and third data windows are composed of digital data having a common phase.

Each of the first plane coefficients, the second plane coefficients and the third plane coefficients may include a first coefficient proportional to vertical and upward correlations with the central pixel, a second coefficient proportional to vertical and downward correlations with the central pixel, a third coefficient proportional to horizontal and leftward correlations with the central pixel and a fourth coefficient proportional to horizontal and rightward correlations with the current pixel.

A value of each combination coefficient is inversely proportional to a relative vertical variation in a corresponding data window. The video signal processing method may be applied to an NTSC or PAL system.

At least one of the above and other features and advantages of the present invention may be realized by providing a video signal processing apparatus, including a weight determination unit to generate a plurality of plane coefficients and combination coefficients using digital data corresponding to a plurality of fields of an input video signal, a filter to convolute filter masks composed of the plane coefficients with corresponding data windows of the input video signal to produce a first chrominance signal $C_1$, a second chrominance signal $C_2$ and a third chrominance signal $C_3$ and a combiner to combine the first, second and third chrominance signals $C_1$-$C_3$ using the combination coefficients to generate a C signal of the input video signal.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 4 illustrates chrominance signal phases of an NTSC system;

FIG. 5 illustrates chrominance signal phases of a PAL system;

DETAILED DESCRIPTION OF THE INVENTION

Figure 1:
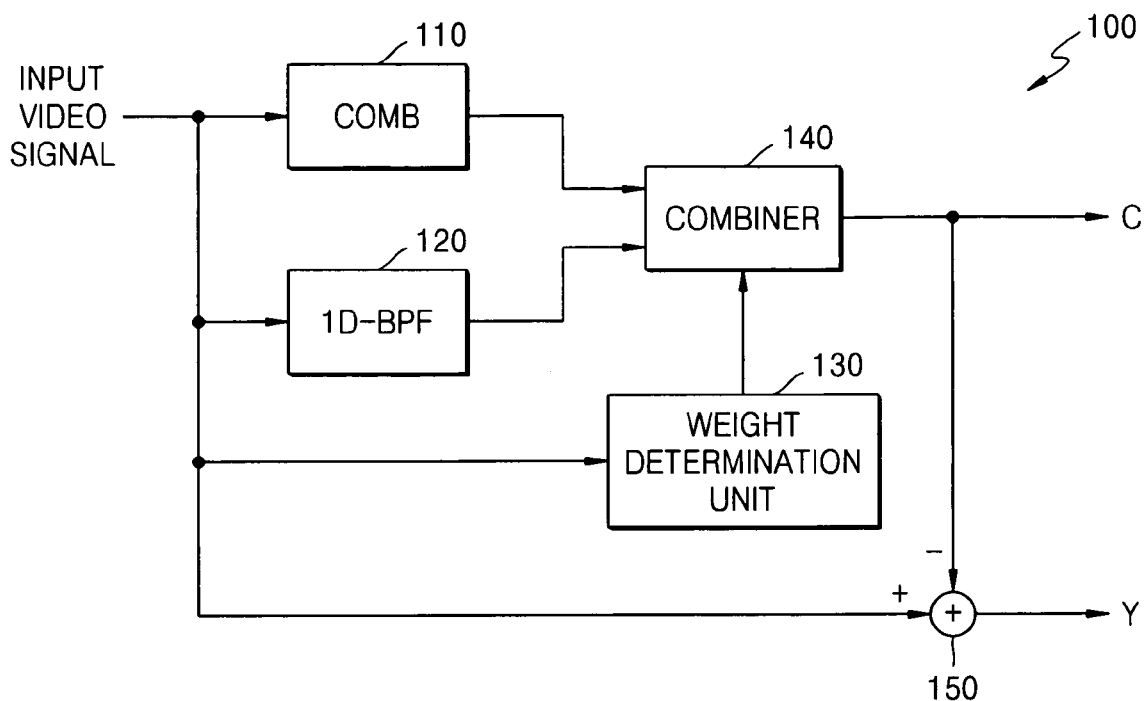
FIG. 1 illustrates a block diagram of a conventional video signal processing apparatus.

Korean Patent Application No.10-2005-0003179, filed on Jan. 13, 2005, in the Korean Intellectual Property Office, and entitled "Digital Video Signal Processing Apparatus and Method for Adaptive Temporal and Spatial Y/C Separation in Multiple Directions," is incorporated by reference herein in its entirety.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 3:
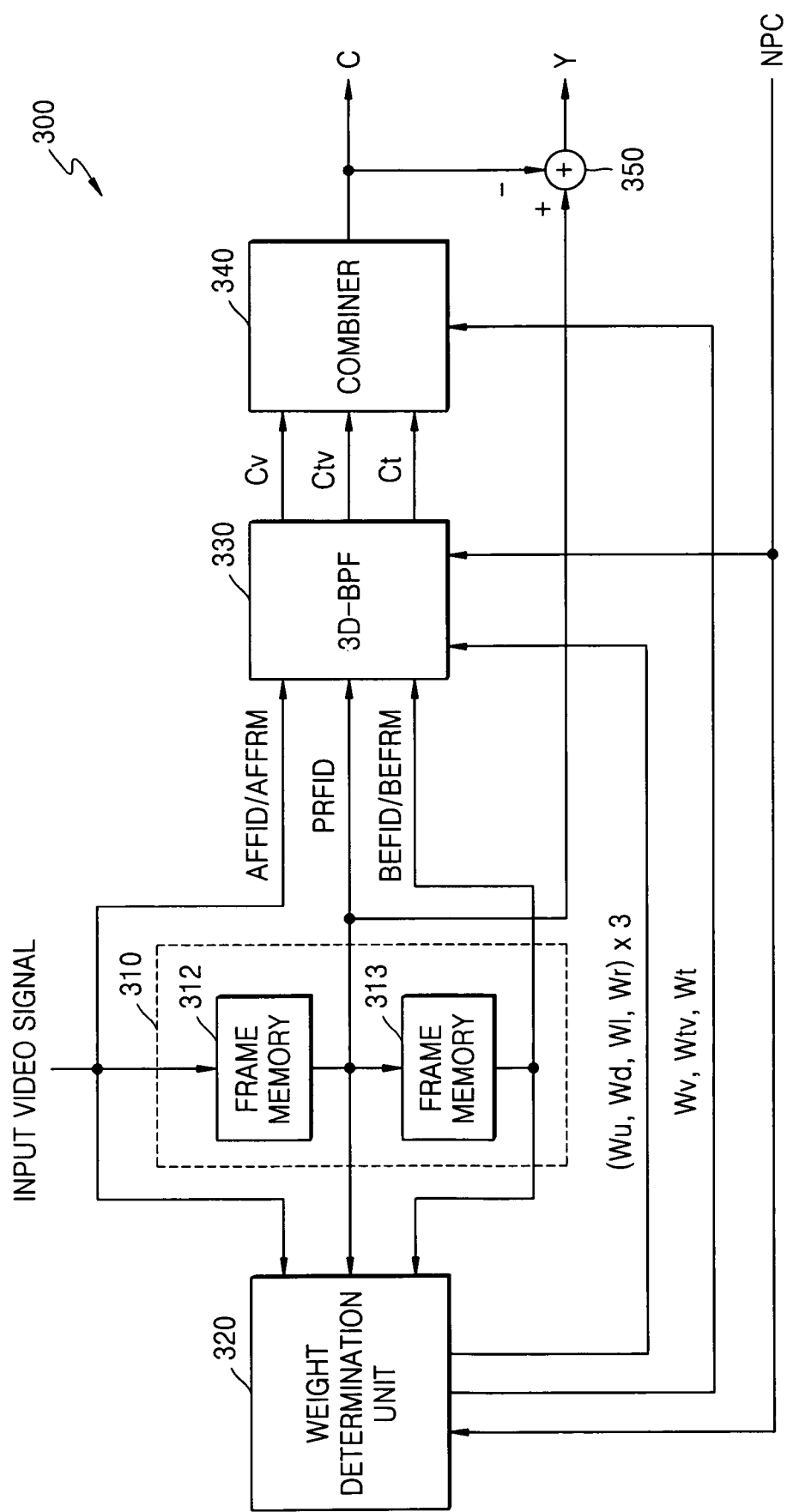
FIG. 3 illustrates a block diagram of a video signal processing apparatus according to an embodiment of the present invention.

FIG. 3 illustrates a block diagram of a video signal processing apparatus 300 according to an embodiment of the present invention. Referring to FIG. 3, the video signal processing apparatus 300 includes a memory 310, a weight determination unit 320, a three-dimensional band pass filter (3D BPF) 330, a combiner 340, and a subtracter 350. The video signal processing apparatus 300 can be used for both an NTSC system and a PAL system. The video signal processing apparatus 300 receives a digital CVBS signal as an input video signal and separates the input video signal into a Y signal and a C signal. The input video signal can be a digital signal obtained by sampling the active video region of an analog CVBS signal at a predetermined frequency, e.g., 4 $f_{sc}$, where $f_{sc}$ is a subcarrier frequency.

An input video signal CVBS(t) of the NTSC system may be represented as follows.

$$CVBS(t) = Y + U^* \sin 2\pi f_{SC} t + V^* \cos 2\pi f_{SC} t, \quad \text{[Equation 1]}$$

where U and V are C components, $f_{sc}$ is a subcarrier frequency, and t is time. Thus, in the NTSC system, pixel signals sampled at 4 $f_{sc}$ have chrominance signal phases as shown in FIG. 4. That is, the pixel signals are repeated in the form of Y+U, Y+V, Y−U, Y−V, . . . for each horizontal line. FIG. 4 illustrates only the phases of the chrominance signal component. In the NTSC system, the chrominance signal phases are shifted by 180° in neighboring horizontal scan lines, as shown in FIG. 4.

Figure 6:
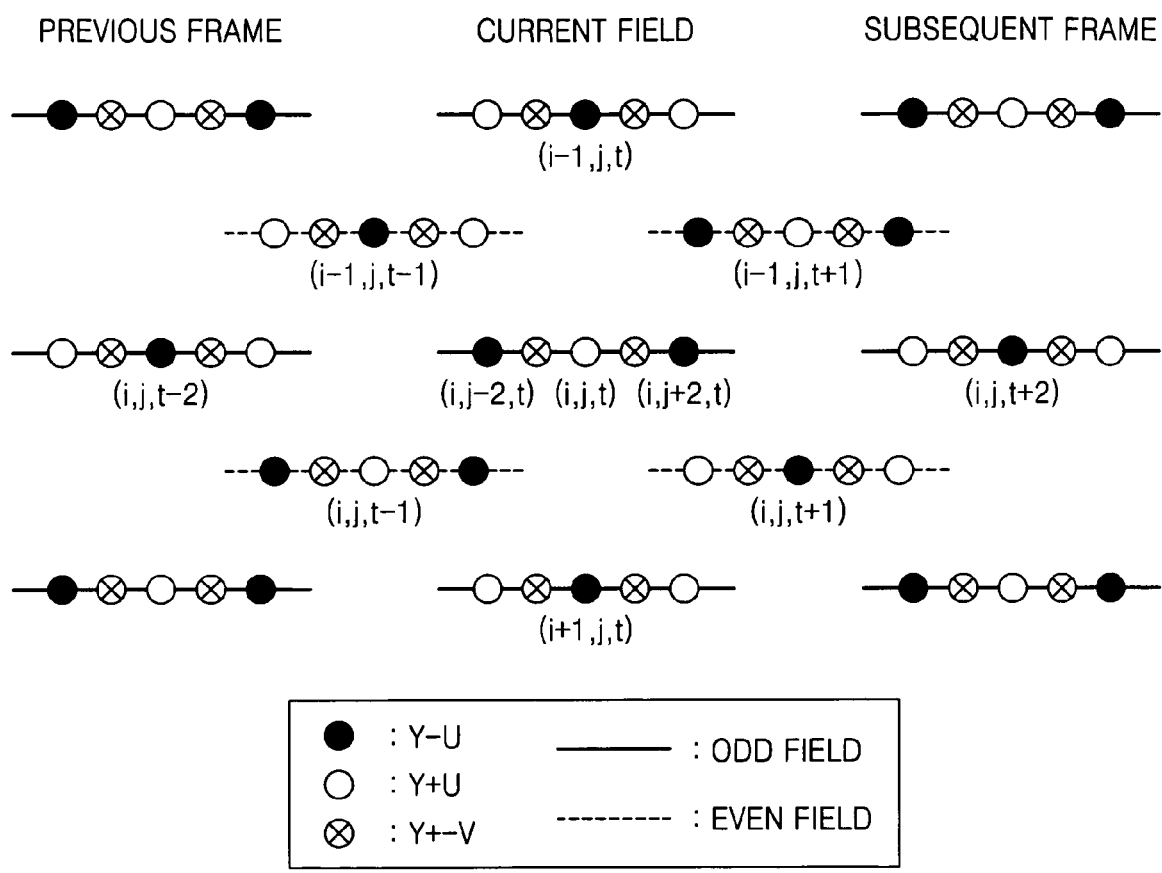
FIG. 6 illustrates spatio-temporal chrominance signal phases of the NTSC system.

The input video signal CVBS(t) of the NTSC system may be represented spatio-temporally as shown in FIG. 6. Referring to FIG. 6, the phase of the C component of the currently processed central pixel at (i, j, t) may have a particular phase, e.g., +U. Pixel signals spatio-temporally disposed in a first diagonal direction from the central pixel, i.e., a pixel at (i−1, j, t+1) of the next field and a pixel at (i, j, t−1) of the previous field, have the same phase as the central pixel. Pixel signals spatio-temporally disposed in a second diagonal direction from the central pixel, i.e., a pixel at (i, j, t+1) of the next field and a pixel at (i−1, j, t−1) of the previous field, have a phase opposite the phase, e.g., −U, of the C component of the central pixel at (i, j, t). In the NTSC system, each frame is composed of two fields, i.e., an odd field and an even field.

An input video signal CVBS(t) of a PAL system may be represented as follows.

$$CVBS(t)=Y+U^*\sin 2\pi f_{SC}t \pm V^*\cos 2\pi f_{SC}t,$$ [Equation 2]

where U and V are C components, $f_{sc}$ is a subcarrier frequency, and t is time. In Equation 2, the sign of the V component alternates between positive and negative every field. Thus, pixel signals in the PAL system have chrominance signal phases as shown in FIG. 5. That is, the pixel signals are repeated in the form of Y+U, Y+V, Y−U, Y−V, . . . or Y+U, Y−V, Y−U, Y+V, . . . in each horizontal line, and the chrominance signal phases are shifted by 180° every other horizontal scan line.

Figure 7:
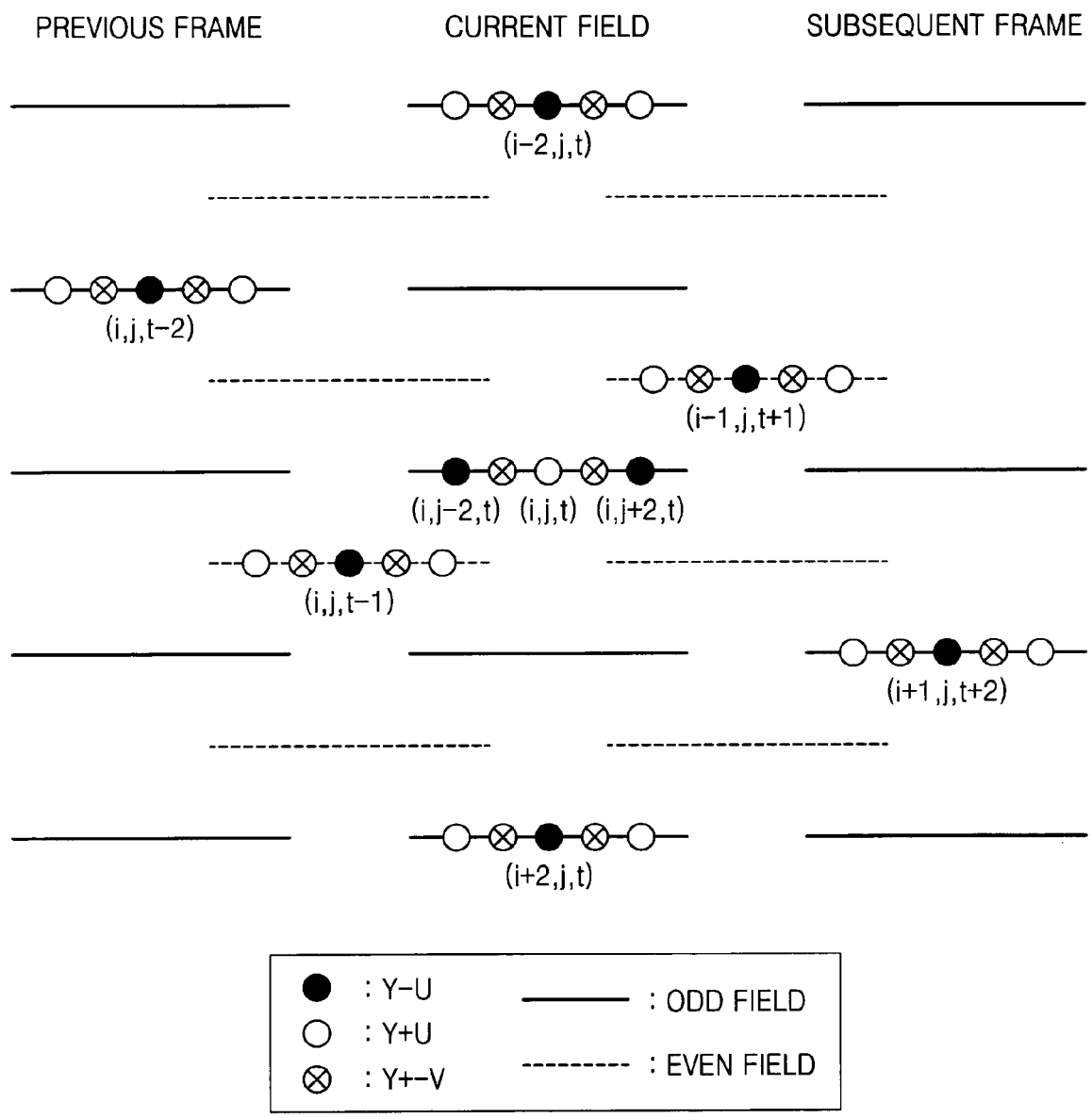
FIG. 7 illustrates spatio-temporal chrominance signal phases of the PAL system.

The input video signal CVBS(t) of the PAL system may be represented spatio-temporally as illustrated in FIG. 7. Referring to FIG. 7, the phase of the C signal component of the currently processed central pixel at (i, j, t) may have a particular phase, e.g., +U. Pixel signals spatio-temporally disposed in a diagonal direction from the current pixel, i.e., a pixel at (i−1, j, t+1) of the next field and a pixel at (i, j, t−1) of the previous field, have a phase opposite the phase of the current pixel signal (i, j, t) of the current field. A pixel at (i+1, j, t+2) located one frame (two fields) after the central pixel and a pixel at (i, j, t−2) located one frame (two fields) before the central pixel also have the phase opposite the phase of the current pixel at (i, j, t) of the current field. Pixels disposed vertically from the central pixel, i.e., pixels at (i−2, j, t) and (i+2, j, t) of the same field, also have the phase opposite the phase of the current pixel at (i, j, t) of the current field.

The Y and C signals (U and V signals) separated by the video signal processing apparatus 300 may be converted to a format required for an external circuit and then stored or transmitted to a display device. For example, the Y and C signals may be interpolated with three color signals, e.g., red, green and blue color signals, to be displayed on a liquid crystal display (LCD).

Rather than discretely carrying out spatio-temporal comb filtering or 1D band pass filtering, the video signal processing apparatus 300 according to an embodiment of the present invention adaptively operates in response to spatio-temporal local characteristics of the input video signal CVBS. For this, the memory 310 stores digital field data corresponding to a plurality of fields of the input video signal. The memory 310 includes a plurality of frame memories 312 and 313, each storing data corresponding to one frame. While FIG. 3 shows only two frame memories 312 and 313, more frame memories can be added to the digital video signal processing apparatus 300 if required for filtering.

The field data corresponding to the plurality of fields, stored in the memory 310, and currently input video data are output to the weight determination unit 320. The weight determination unit 320 generates plane coefficients Wu, Wd, Wl and Wr and combination coefficients Wv, Wtv and Wt, which will be used for filtering in the 3D BPF 330, using the field data. When a network parameter control (NPC) signal has a logic high level, plane coefficients Wu, Wd, Wl and Wr and combination coefficients Wv, Wtv and Wt may be generated for the NTSC system having the chrominance signal phases shown in FIG. 4. When the control signal NPC has a logic low level, plane coefficients Wu, Wd, Wl and Wr and combination coefficients Wv, Wtv and Wt may be generated for the PAL system having the chrominance signal phases shown in FIG. 5. While the plane coefficients Wu, Wd, Wl and Wr and combination coefficients Wv, Wtv and Wt are generated for both the NTSC and PAL systems, data used to generate the coefficients for the NTSC system are different from data used to generate the coefficients for the PAL system.

In opertaion, the 3D BPF 330 generates a first C signal $C_v(i, j)$, a second C signal $C_{tv}(i, j)$ and a third C signal $C_t(i, j)$ using the plane coefficients Wu, Wd, Wl and Wr and combination coefficients Wv, Wtv and Wt. The 3D BPF 330 uses data windows BEFRM (before frame), BEFID (before field), PRFID (present field), AFFID (after field) and AFFRM (after frame) including a plurality of fields, which will be convoluted with filter masks in response to the NPC signal.

The combiner 340 combines the first, second and third C signals $C_v(i, j)$, $C_{tv}(i, j)$ and $C_t(i, j)$ using the combination coefficients Wv, Wtv and Wt to produce the C signal of the input video signal. The subtracter 350 subtracts the C signal (U or V signal) of the currently processed pixe,l output from the combiner 340, from the current composite signal CVBS(t) to obtain the Y signal. For example, when the U signal output as the C signal is subtracted from the video signal of the current pixel Y+U, the Y signal is obtained.

The 3D BPF 330 continuously and adaptively performs local vertical comb filtering, horizontal band pass filtering and 2D band pass filtering in response to spatio-temporal local characteristics of the input video signal. That is, the 3D BPF 330 may perform filtering using filter masks for convolution with field data items for at least five fields in accordance with current local characteristics. The 3D BPF 330 may perform local vertical comb filtering when the local characteristics of the central pixel to be filtered indicate high vertical correlation and performs local horizontal band pass filtering when the local characteristics indicate high horizontal correlation. When the local characteristics of the input video signal indicate high or low correlation in both the vertical and horizontal directions, the 3D BPF 330 may perform 2D band pass filtering. The 3D BPF 330 may use filter masks, i.e., a plurality of coefficient masks, composed of the three combinations of the plane coefficients Wu, Wd, Wl and Wr.

The filter masks may include a first coefficient mask $h_v(i, j)$, a second coefficient mask $h_{tv}(i, j)$ and a third coefficient mask $h_t(i, j)$. The three groups of the plane coefficients Wu, Wd, Wl and Wr may be respectively used to generate the three coefficient masks $h_v(i, j)$, $h_{tv}(i, j)$ and $h_t(i, j)$. The three groups of the plane coefficients Wu, Wd, Wl and Wr are generated with reference to different data.

The first, second and third C signals $C_v(i, j)$, $C_{tv}(i, j)$ and $C_t(i, j)$ output from the 3D BPF 330 may be represented as follows.

$$C_v(i,j)=h_v(i,j)^{**}CVBS_v(i,j)$$

$$C_{tv}(i,j)=h_{tv}(i,j)^{**}CVBS_{tv}(i,j)$$

$$C_t(i,j)=h_t(i,j)^{**}CVBS_t(i,j)$$ [Equation 3]

That is, the 3D BPF 330 may 2D-convolute the first coefficient mask $h_v(i, j)$ with a corresponding data window $CVBS_v(i, j)$ of the field data stored in the memory 310 to output the first C signal $C_v(i, j)$ of the input video signal, 2D-convolute the second coefficient mask $h_{tv}(i, j)$ with a corresponding data window $CVBS_{tv}(i, j)$ of the field data stored in the memory 310 to output the second C signal $C_{tv}(i, j)$ of the input video signal, and 2D-convolute the third coefficient mask $h_t(i, j)$ with a corresponding data window $CVBS_t(i, j)$ of the field data stored in the memory 310 to output the third C signal $C_t(i, j)$.

The combiner 340 may combine the first, second and third C signals $C_v(i, j)$, $C_{tv}(i, j)$ and $C_t(i, j)$ to output the C signal of the input video signal. The Y signal output from the subtracter 350 may be a value obtained by subtracting the C signal (U or V signal) of the currently processed pixel output from the combiner 340 from the current composite signal as follows.

$$Y(i,j) = CVBS(i,j) - C(i,j) \quad \text{[Equation 4]}$$

In both the NTSC and PAL modes, the first, second and third coefficient masks $h_v(i, j)$, $h_{tv}(i, j)$ and $h_t(i, j)$ may be represented by a 3×5 matrix as follows.

$$h_v(i,j) / h_{tv}(i,j) / h_t(i,j) = \begin{bmatrix} Wu \cdot Wl & 0 & 0.5 \cdot Wu & 0 & Wu \cdot Wr \\ 0.5 \cdot Wl & 0 & N & 0 & 0.5 \cdot Wr \\ Wd \cdot Wl & 0 & 0.5 \cdot Wd & 0 & Wd \cdot Wr \end{bmatrix} \quad \text{[Equation 5]}$$

The filter masks represented by Equation 5 are used for both the NTSC and PAL systems, although the NTSC and PAL systems use different data for convolution.

In Equation 5, N may be a normalizing value that ensures that the sum of the absolute values of the coefficients and N is 1. The data window $CVBS(i, j)$ used for convolution by the 3D BPF 330, represented by Equation 3, may be data corresponding to the 3×5 matrix of Equation 5. In particular, pixel data corresponding to non-zero elements in Equation 5 may be used for convolution of Equation 3.

Figure 8:
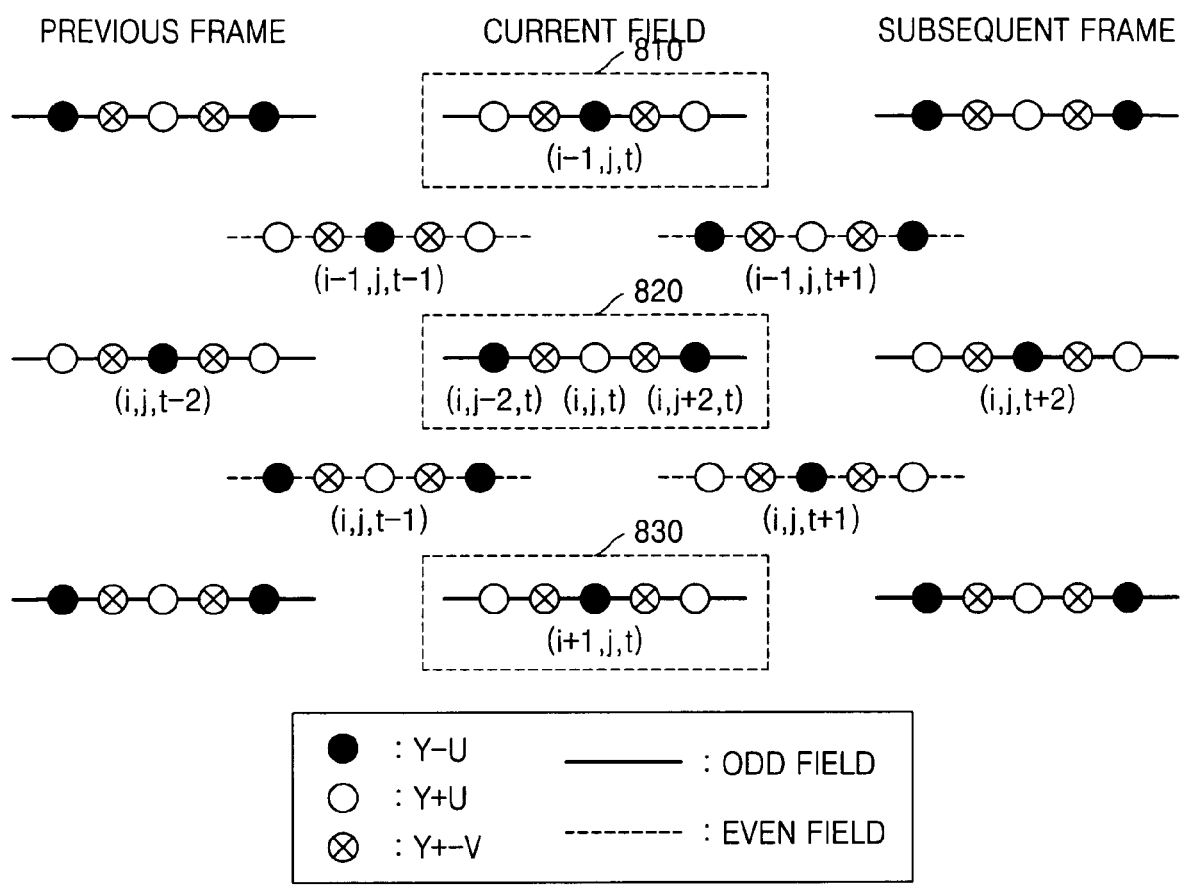
FIG. 8 illustrates a diagram for explaining a horizontal/vertical filter coefficient of the NTSC system.

In the NTSC system, the first coefficient mask $h_v(i, j)$, represented by the matrix of Equation 5, may be applied to the data window $CVBS_v(i, j)$ including pixel data 810, 820 and 830 illustrated in FIG. 8. That is, the first coefficient mask $h_v(i, j)$ may be convoluted with the data window $CVBS_v(i, j)$ in horizontal and vertical directions, as represented by Equation 3. The data window $CVBS_v(i, j)$ composed of the pixel data 810, 820 and 830 of FIG. 8, may belong to a data plane including at least three horizontal scan line digital data windows PRFID of the currently processed field.

Figure 9:
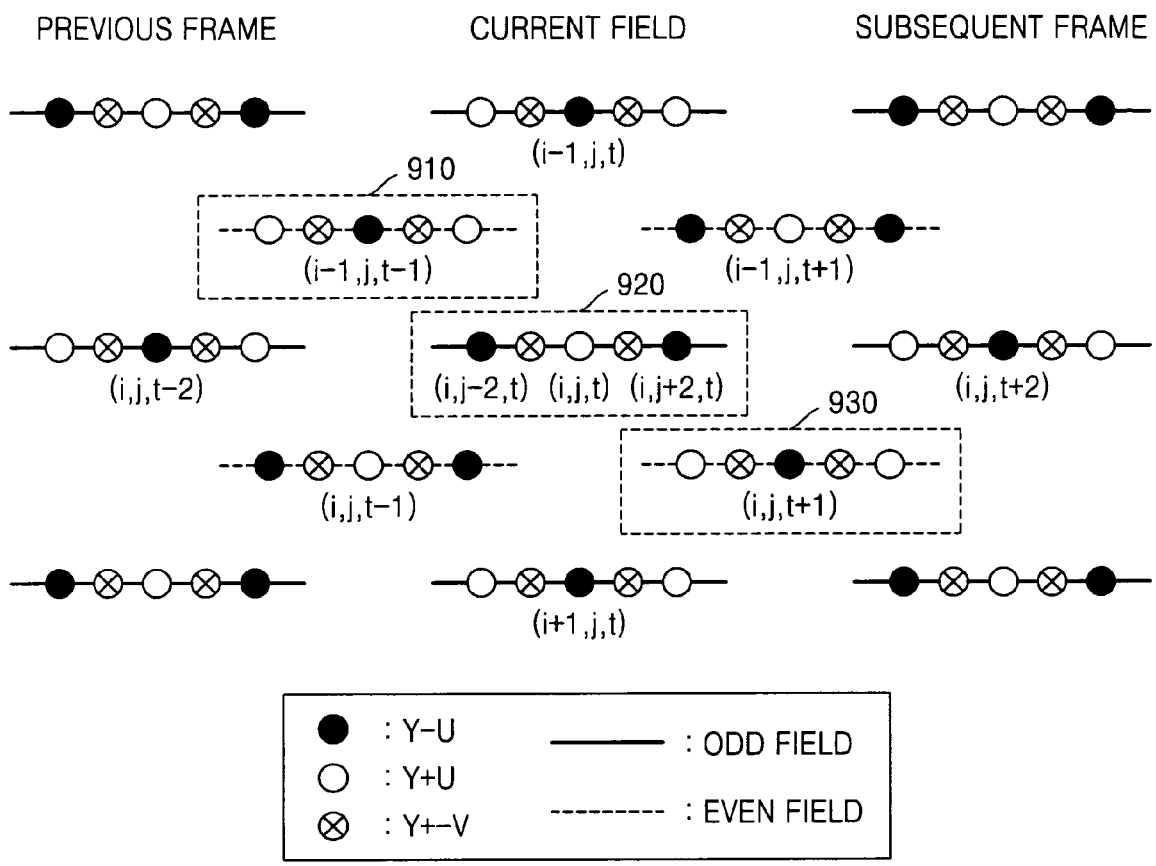
FIG. 9 illustrates a diagram for explaining a horizontal/vertical/temporal filter coefficient of the NTSC system.

Furthermore, the second coefficient mask $h_{tv}(i, j)$ represented by the matrix of Equation 5, may be applied to the data window $CVBS_{tv}(i, j)$ including pixel data 910, 920 and 930 illustrated in FIG. 9. That is, the second coefficient mask $h_{tv}(i, j)$ may be convoluted with the data window $CVBS_{tv}(i, j)$ in horizontal, vertical and diagonal directions, as represented by Equation 3. The data window $CVBS_{tv}(i, j)$, composed of the pixel data 910, 920 and 930 of FIG. 9, may belong to a data plane including at least a horizontal scan line digital data window BEFID of the previous field, a horizontal scan line digital data window PRFID of the current field, and a horizontal scan line digital data window AFFID of the next field.

Figure 10:
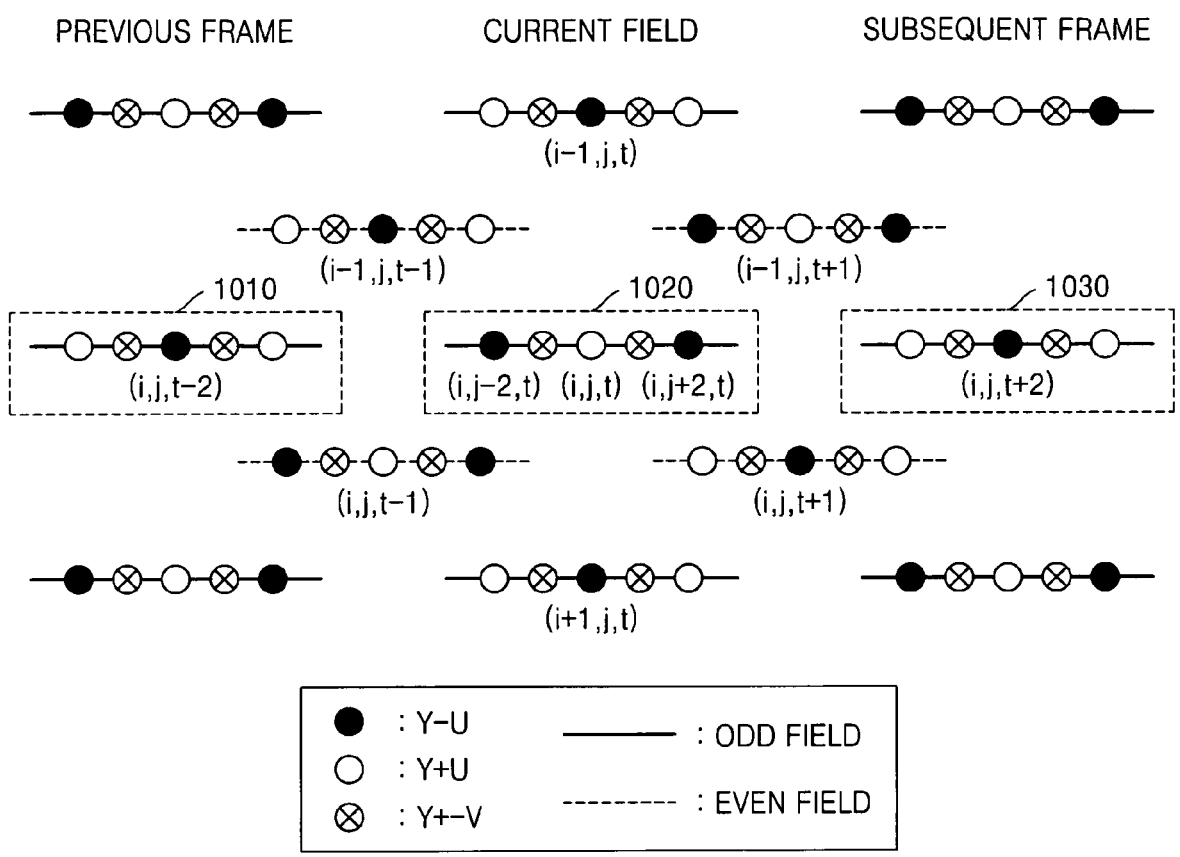
FIG. 10 illustrates a diagram for explaining a horizontal/temporal filter coefficient of the NTSC system.

In addition, the third coefficient mask $h_t(i, j)$ represented by the matrix of Equation 5, may be applied to the data window $CVBS_t(i, j)$ including pixel data 1010, 1020 and 1030 illustrated in FIG. 10. In other words, the third coefficient mask $h_t(i, j)$ may be convoluted with the data window $CVBS_t(i, j)$ in horizontal and temporal directions, as represented by Equation 3. The data window $CVBS_t(i, j)$, composed of the pixel data 1010, 1020 and 1030 of FIG. 10, may belong to a data plane including at least a horizontal scan line digital data window BEFRM of a field two fields (one frame) prior, a horizontal scan line digital data window PRFID of the current field, and a horizontal scan line digital data window AFFRM of a field two fields (one frame) after.

Figure 14:
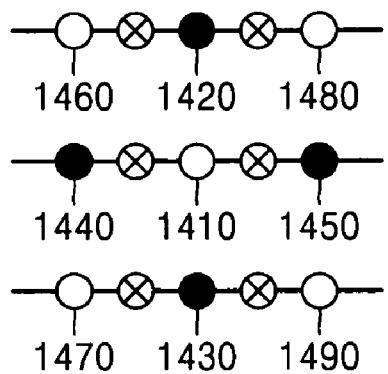
FIG. 14 illustrates a common phase data window to be convoluted with filter coefficients.

In the data windows, illustrated in FIGS. 8, 9 and 10, which are respectively convoluted with the first, second and third coefficient masks $h_v(i, j)$, $h_{tv}(i, j)$ and $h_t(i, j)$, corresponding line data may have a common phase relationship in each line, as illustrated in FIG. 14. Accordingly, the coefficient masks $h_v(i, j)$, $h_{tv}(i, j)$ and $h_t(i, j)$, represented by the matrix of Equation 5, have the same form including the same plane coefficients Wu, Wd, Wl and Wr. However, the pixel data used to calculate the plane coefficients Wu, Wd, Wl and Wr to obtain the elements of the coefficient masks are located in different data planes, as shown in FIGS. 8, 9 and 10.

Among pixel data corresponding to non-zero elements in Equation 5, i.e., the common phase data window shown in FIG. 14, vertical and horizontal data 1420, 1430, 1440 and 1450 having C component phases opposite to the phase of a central pixel 1410 and diagonal data 1460, 1470, 1480 and 1490 having C component phases identical to the phase of the central pixel 1410 are used for the convolution of Equation 3.

In the PAL system, the convolution of Equation 3 may be executed using first, second and third coefficient masks $h_v(i, j)$, $h_{tv}(i, j)$ and $h_t(i, j)$, as in the NTSC system. In the PAL system, the first coefficient mask $h_v(i, j)$, represented by the matrix of Equation 5, may be applied to the data window $CVBS_v(i, j)$ including pixel data 1110, 1120 and 1130 illustrated in FIG. 11. That is, the first coefficient mask $h_v(i, j)$ may be convoluted with the data window $CVBS_v(i, j)$ in horizontal and vertical directions, as represented by Equation 3. The data window $CVBS_v(i, j)$, composed of the pixel data 1110, 1120 and 1130 of FIG. 11, may belong to a data plane including at least three horizontal scan line digital data windows PRFID of the currently processed field.

Figure 12:
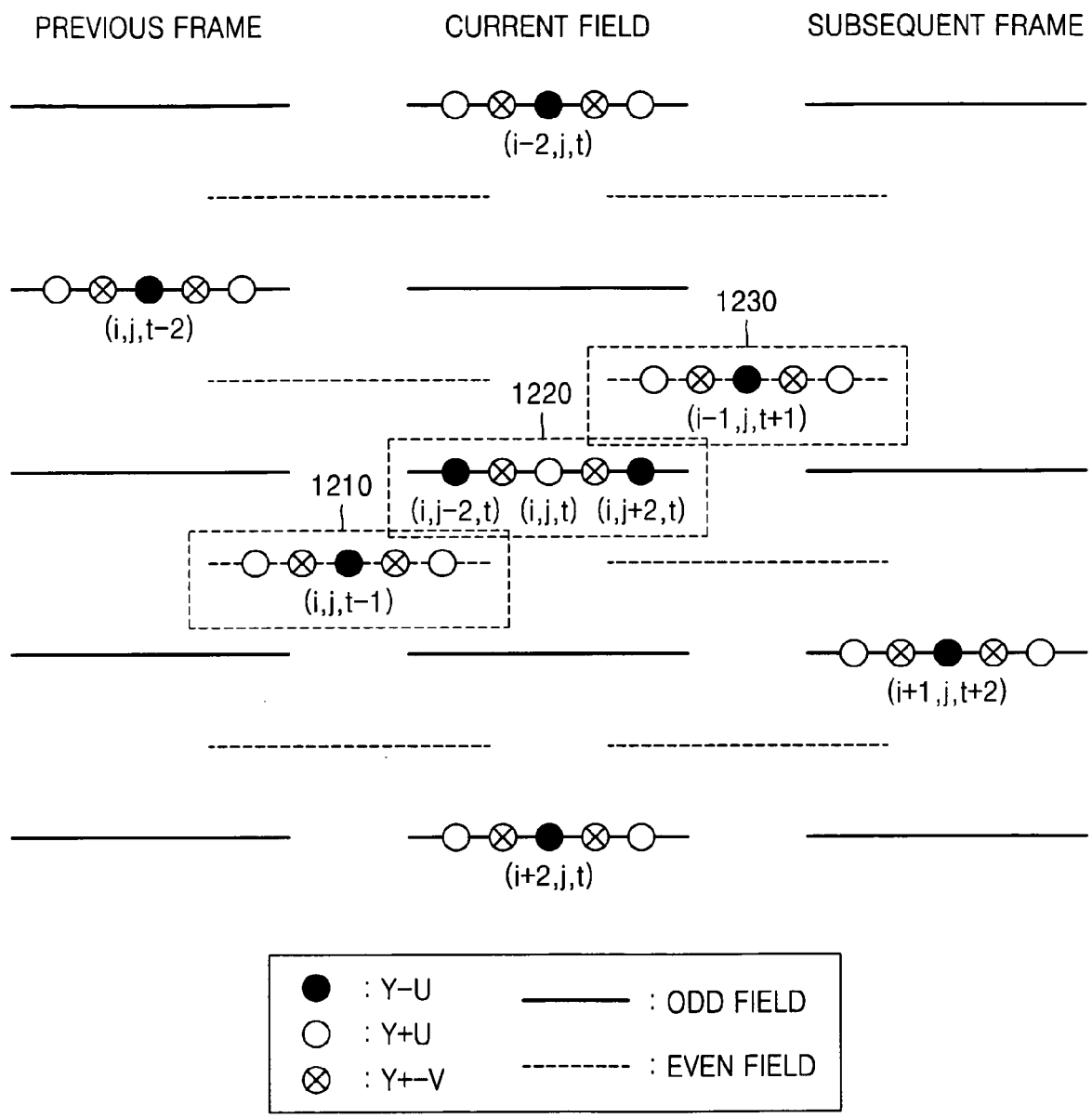
FIG. 12 illustrates a diagram for explaining a horizontal/vertical/temporal filter coefficient of the PAL system.

Furthermore, the second coefficient mask $h_{tv}(i, j)$, represented by the matrix of Equation 5, may be applied to the data window $CVBS_{tv}(i, j)$ including pixel data 1210, 1220 and 1230 illustrated in FIG. 12. That is, the second coefficient mask $h_{tv}(i, j)$ may be convoluted with the data window $CVBS_{tv}(i, j)$ in horizontal, vertical and diagonal directions, as represented by Equation 3. The data window $CVBS_{tv}(i, j)$, composed of the pixel data 1210, 1220 and 1230 of FIG. 12, may belong to a data plane including at least a horizontal scan line digital data window BEFID of the previous field, a horizontal scan line digital data window PRFID of the current field, and a horizontal scan line digital data window AFFID of the next field.

Figure 13:
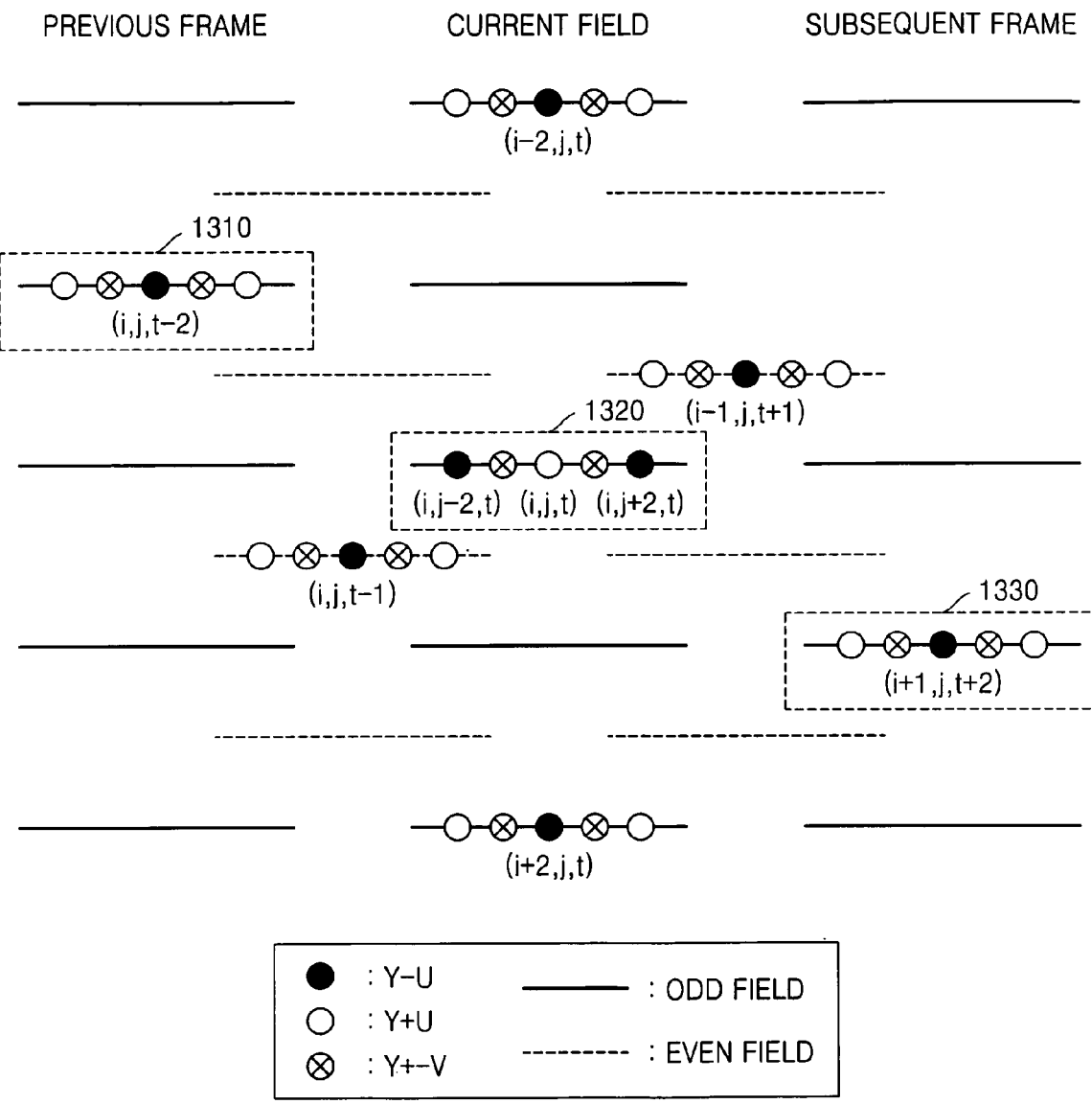
FIG. 13 illustrates a diagram for explaining a horizontal/temporal filter coefficient of the PAL system.

In addition, the third coefficient mask $h_t(i, j)$, represented by the matrix of Equation 5, may be applied to the data window $CVBS_t(i, I)$ including pixel data 1310, 1320 and 1330 illustrated in FIG. 13. That is, the third coefficient mask $h_t(i, j)$ may be convoluted with the data window $CVBS_t(i, j)$ in horizontal and temporal directions, as represented by Equation 3. The data $CVBS_t(i, j)$, composed of the pixel data 1310, 1320 and 1330 of FIG. 13, may belong to a data plane including at least a horizontal scan line digital data window BEFRM of a field two fields (one frame) prior, a horizontal scan line digital data window PRFID of the current field, and a horizontal scan line digital data window AFFRM of a field two fields (one frame) after.

Figure 11:
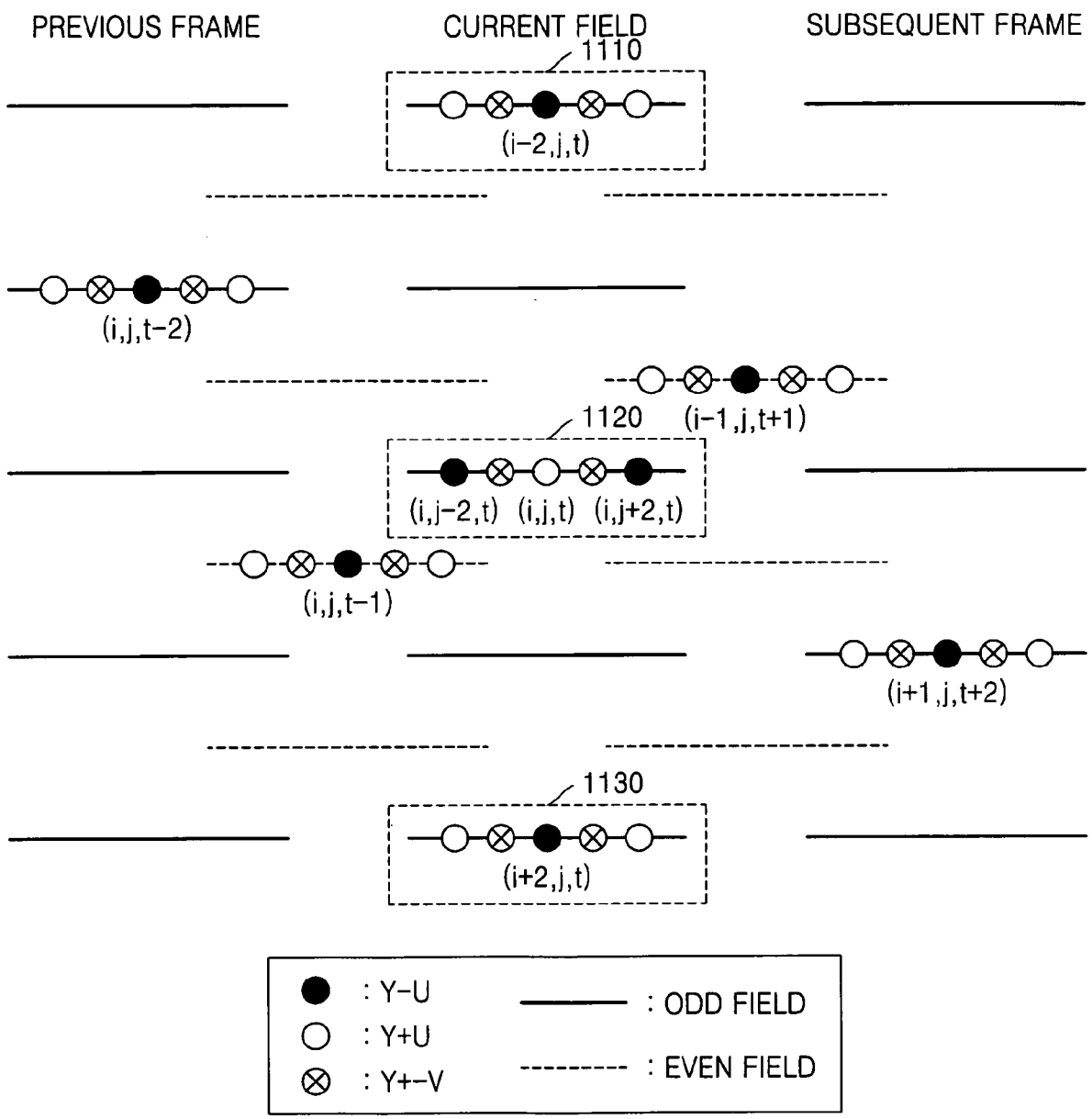
FIG. 11 illustrates a diagram for explaining a horizontal/vertical filter coefficient of the PAL system.

In the data windows illustrated in FIGS. 11, 12 and 13, which are respectively convoluted with the first, second and third coefficient masks $h_v(i, j)$, $h_{tv}(i, j)$ and $h_t(i, j)$, corresponding multiple line data have the common phase relationship in each line, as shown in FIG. 14. Accordingly, the coefficient masks $h_v(i, j)$, $h_{tv}(i, j)$ and $h_t(i, j)$, represented by the matrix of Equation 5, have the same form including the same plane coefficients Wu, Wd, Wl and Wr. However, the pixel data used for calculating the plane coefficients Wu, Wd, Wl and Wr to obtain elements of the coefficient masks are located in different data planes, as shown in FIGS. 11, 12 and 13.

Among pixel data corresponding to non-zero elements in Equation 5, i.e., the common phase data window shown in FIG. 14, vertical and horizontal data 1420, 1430, 1440 and 1450 having C component phases opposite to the phase of the central pixel 1410 and diagonal data items 1460, 1470, 1480 and 1490 having C component phases identical to the phase of the central pixel 1410 are used for the convolution of Equation 3.

Weights Wu, Wd, Wl and Wr in Equation 5 are respectively applied to the pixels 1420, 1430, 1440 and 1450 having phases opposite to the phase of the central pixel 1410, and have values of between −0.5 and 0, inclusive, according to local characteristics of an image. Weights WuWl, WdWl, WuWr and WdWr are respectively applied to the diagonal pixels 1460, 1470, 1480 and 1490 having the same phase as the central pixel 1410, and accordingly have values of between 0 and 0.25, inclusive, according to local characteristics of the image.

The plane coefficients Wu, Wd, Wl and Wr used in Equation 5 are determined such that they satisfy Equation 6.

$$|Wu| \propto \frac{1}{VARv} (\text{or } VARh) \text{ and } |Wu| \propto \frac{1}{VARu} (\text{or } Vard) \quad [\text{Equation 6}]$$

$$|Wd| \propto \frac{1}{VARv} (\text{or } VARh) \text{ and } |Wd| \propto \frac{1}{VARd} (\text{or } VARu)$$

$$|Wl| \propto \frac{1}{VARh} (\text{or } VARv) \text{ and } |Wl| \propto \frac{1}{VARl} (\text{or } VARr)$$

$$|Wr| \propto \frac{1}{VARh} (\text{or } VARv) \text{ and } |Wr| \propto \frac{1}{VARr} (\text{or } VARl)$$

where VARv is a vertical variation in the input video signal, VARh is a horizontal variation in the input video signal, VARu is an upward variation in the input video signal, VARd is a downward variation, VARl is a leftward variation and VARr is a rightward variation.

In an embodiment of the present invention, Equation 6 is given by the following.

$$Wu = -0.5 \times \frac{Difh}{Difh \times Difv} \times \frac{Difd}{Difu \times Difd} \quad [\text{Equation 7}]$$

$$Wd = -0.5 \times \frac{Difh}{Difh \times Difv} \times \frac{Difu}{Difu + Difd}$$

$$Wl = -0.5 \times \frac{Difv}{Difh + Difv} \times \frac{Difr}{Difr + Difl}$$

$$Wr = -0.5 \times \frac{Difv}{Difh + Difv} \times \frac{Difl}{Difr + Difl}$$

Figure 15:
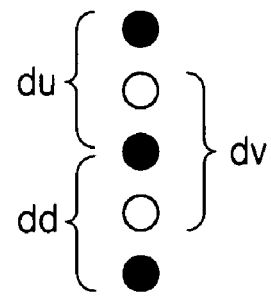
FIG. 15 illustrates a vertical variation in pixels.
Figure 16:
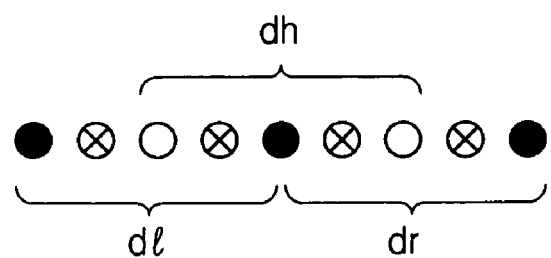
FIG. 16 illustrates a horizontal variation in pixels.

In Equation 7, Difv is the absolute value of a vertical difference, Difh is the absolute value of a horizontal difference, Difu is the absolute value of an upward difference, Difd is the absolute value of a downward difference, Difl is the absolute value of a leftward difference and Difr is the absolute value of a rightward difference. Referring to FIG. 15, for example, Difv=du+dd+dv, Difu=du and Difd=dd. Referring to FIG. 16, Difh=dl+dr+dh, Difl=dl and Difr=dr. Here, du is the absolute value of the difference between the pixel data at (i, j) and the pixel data at (i−2, j) in the common plane illustrated in FIG. 15, dd is the absolute value of the difference between the pixel data at (i, j) and the pixel data (i+2, j) in the common plane illustrated in FIG. 15, dv is the absolute value of the difference between the pixel data at (i−1, j) and the pixel data at (i+1, j) in the common plane illustrated in FIG. 15, dl is the absolute value of the difference between the pixel data at (i, j) and the pixel data at (i, j−4) in the common plane illustrated in FIG. 16, dr is the absolute value of the difference between the pixel data at (i, j) and the pixel data at (i, j+4) in the common plane illustrated in FIG. 16 and dh is the absolute value of the difference between the pixel data at (i, j−2) and the pixel data at (i, j+2) in the common plane illustrated in FIG. 16.

In Equation 7, the absolute value of the difference between pixel data having the same phase is used. The absolute values are calculated with reference to five horizontal scan line data. While FIGS. 6 through 14 show three horizontal scan line data convoluted with the coefficient masks, two more horizontal scan line data items in a required direction in each plane can be used for the calculation of Equation 7. Furthermore, various combinations of pixel data having the same phase can be used to represent horizontal/vertical/leftward/rightward variations. Consequently, Wu is proportional to vertical and upward correlations with the central pixel, Wd is proportional to vertical and downward correlations with the central pixel, Wl is proportional to horizontal and leftward correlations with the central pixel and Wr is proportional to horizontal and rightward correlations with the central pixel.

The 3D BPF 330 performs filtering by the convolution of Equation 3 using the plane coefficients Wu, Wd, Wl and Wr, determined as above, to adaptively perform comb filtering, 1D BPF filtering and 2D BPF filtering in a continuous manner according to the local characteristics of the input video signal in both NTSC and PAL systems. For example, when the edge direction is fixed vertically in the planes of FIGS. 6 through 13, i.e., when the local characteristics of the input video signal indicate high vertical correlation, Wr and Wl become small and |Wu| and |Wd| become large, so that comb filtering is performed on pixels 1410, 1420 and 1430 (FIG. 14) in the vertical direction.

When the edge direction is fixed horizontally in the planes of FIGS. 6 through 13, i.e., when the local characteristics of the input video signal indicate high horizontal correlation, Wu and Wd become small and |Wl| and |Wr| become large, so that 1D band pass filtering is performed on pixels 1410, 1440 and 1450 (FIG. 14) in the horizontal direction. In addition, when the local characteristics of the input video signal indicate high or low correlation in both the vertical and horizontal directions, all the coefficients Wu, Wd, Wl and Wr are significant, so that 2D band pass filtering is performed.

Figure 17:
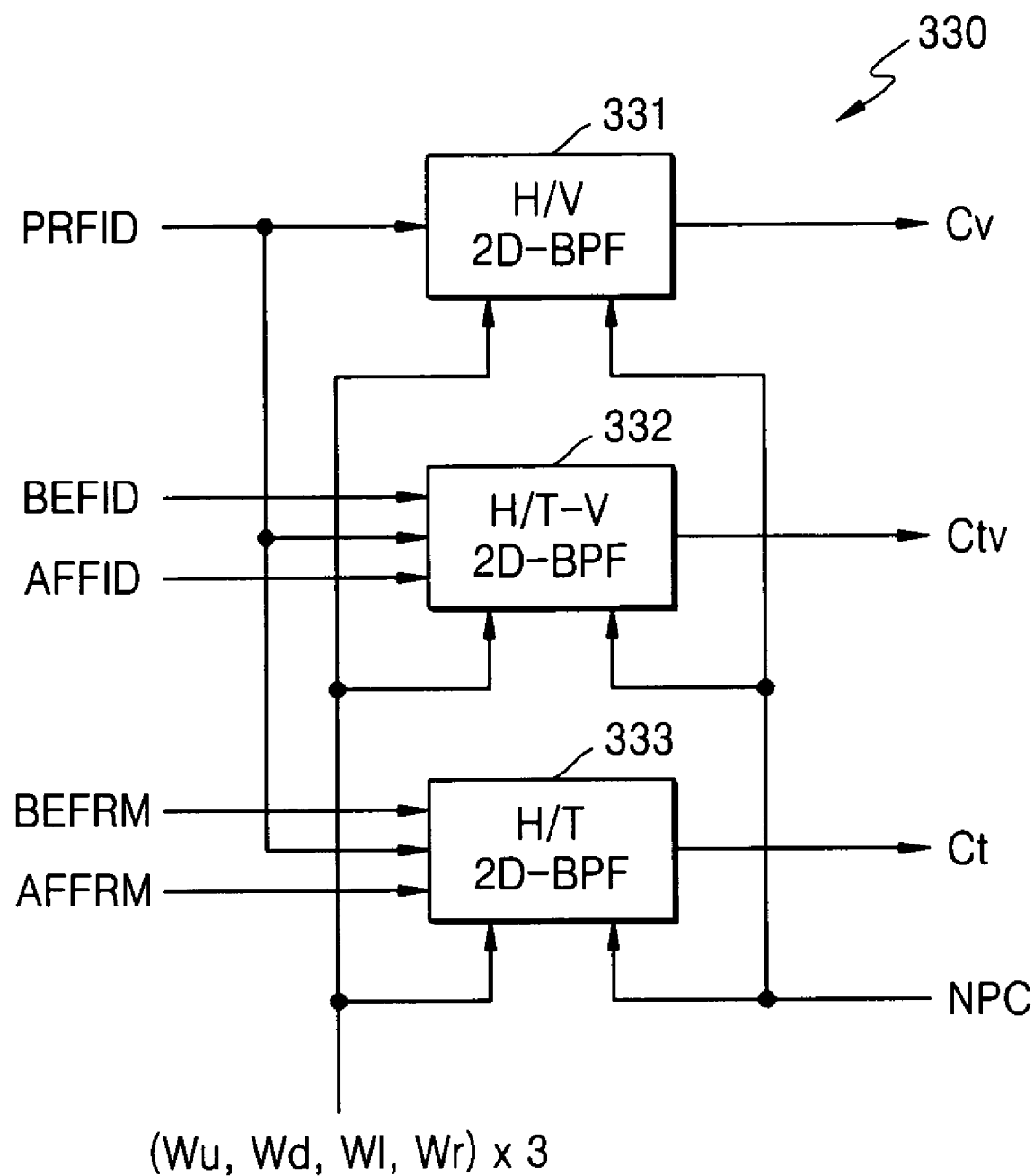
FIG. 17 illustrates a block diagram of the 3D BPF of the video signal processing apparatus illustrated in FIG. 3.

FIG. 17 is a block diagram of the 3D BPF 330. Referring to FIG. 17, the 3D BPF 330 includes a horizontal/vertical filter 331, a horizontal/vertical/temporal filter 332, and a horizontal/temporal filter 333. The 3D BPF 330 operates in the NTSC mode or the PAL mode in response to the control signal NPC.

When the control signal NPC has a logic high level, for example, the 3D BPF 330 operates in the NTSC mode. In this case, the 3D BPF 330 may use the data windows PRFID, BEFID, AFFID, BEFRM and AFFRM of five fields of the planes illustrated in FIGS. 8, 9 and 10. In the NTSC system, PRFID corresponds to the pixel data 810, 820 and 830 of three horizontal scan lines of the current field in the plane illustrated in FIG. 8, BEFID corresponds to the pixel data 910 of the previous field in the plane illustrated in FIG. 9, AFFID corresponds to the pixel data 930 of the next field in the plane illustrated in FIG. 9, BEFRM corresponds to the pixel data 1010 of the field two fields (one frame) prior in the plane illustrated in FIG. 10, and AFFRM corresponds to the pixel data 1030 of the field two fields (one frame) after in the plane illustrated in FIG. 10. The data items 920 and 1020 of FIGS. 9 and 10 correspond to the data 820 of FIG. 8.

When the control signal NPC has a logic low level, the 3D BPF operates in the PAL mode. In this case, the 3D BPF 330 may use the data windows PRFID, BEFID, AFFID, BEFRM and AFFRM of five fields of the planes illustrated in FIGS. 11, 12 and 13. In the PAL system, PRFID corresponds to the pixel data 1110, 1120 and 1130 of three horizontal scan lines of the current field in the plane illustrated in FIG. 11, BEFID corresponds to the pixel data 1210 of the previous field in the plane illustrated in FIG. 12, AFFID corresponds to the pixel data 1230 of the next field in the plane illustrated in FIG. 12, BEFRM corresponds to the pixel data 1310 of the field two fields (one frame) prior in the plane illustrated in FIG. 13, and AFFRM corresponds to the pixel data 1330 of the field two fields (one frame) after in the plane illustrated in FIG. 13. The data items 1220 and 1320 of FIGS. 12 and 13 correspond to the data 1120 of FIG. 11.

While the following description refers to the NTSC system, the corresponding features for the PAL system are indicated in parentheses. In the NTSC (PAL) system, the horizontal/vertical filter 331 may convolute the first coefficient mask $h_v(i, j)$ and corresponding data windows of the plane illustrated in FIG. 8 (FIG. 9) to produce the first C signal $C_v(i, j)$. The corresponding data windows may include at least three horizontal scan line digital data windows PRFID of the current field. The first coefficient mask $h_v(i, j)$ may be composed of corresponding plane coefficients Wu, Wd, Wl and Wr, which may be calculated using Equation 7 with reference to the data 810 (1110), 820 (1120) and 830 (1130) of the plane illustrated in FIG. 8 (FIG. 11).

Figure 2:
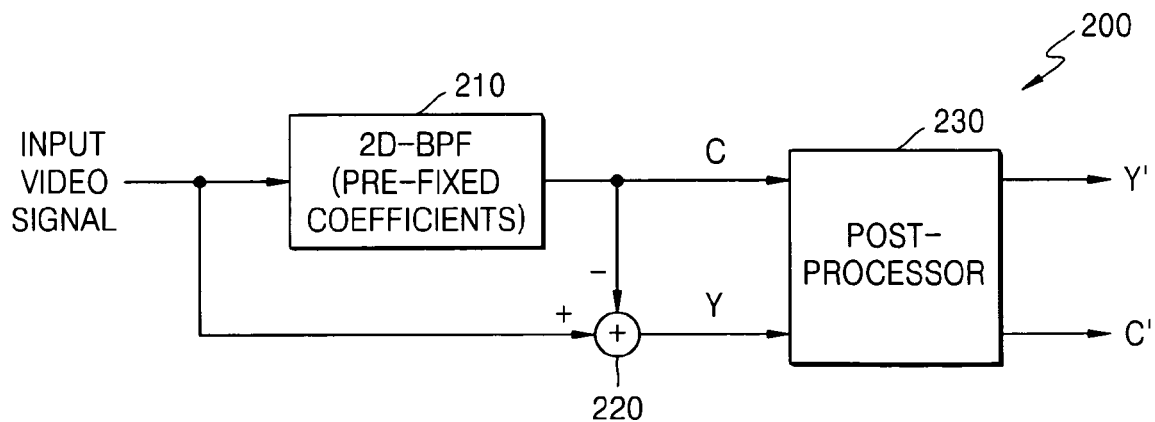
FIG. 2 illustrates a block diagram of another conventional video signal processing apparatus.

The horizontal/vertical/temporal filter 332 may convolute the second coefficient mask $h_{tv}(i, j)$ and corresponding data windows of the plane illustrated in FIG. 9 (FIG. 2) to produce the second C signal $C_{tv}(i, j)$. The corresponding data windows may include the horizontal scan line digital data window BEFID of the previous field, the horizontal scan line digital data window PRFID of the current field and the horizontal scan line digital data window AFFID of the next field. The second coefficient mask $h_{tv}(i, j)$ may be composed of corresponding plane coefficients Wu, Wd, Wl and Wr, which may be calculated using Equation 7 with reference to the data 910 (1210), 920 (1220) and 930 (1230) of the plane illustrated in FIG. 9 (FIG. 12), as described above.

The horizontal/temporal filter 333 may convolute the third coefficient mask $h_t(i, j)$ and corresponding data windows of the plane illustrated in FIG. 10 (FIG. 13) to produce the third C signal $C_t(i, j)$. The corresponding data windows may include the horizontal scan line digital data window BEFRM of the field two fields (one frame) prior, the horizontal scan line digital data window PRFID of the current field and the horizontal scan line digital data window AFFRM of the field two fields (one frame) after. The third coefficient mask $h_t(i, j)$ may be composed of corresponding plane coefficients Wu, Wd, Wl and Wr, which may be calculated using Equation 7 with reference to the data 1010 (1310), 1020 (1320) and 1030 (1330) of the plane illustrated in FIG. 10 (FIG. 13).

The combiner 340 (in FIG. 3) combines the first, second and third C signals $C_v(i,j), C_{tv}(i,j)$ and $C_t(i,j)$ produced by the 3D BPF 330 to output the C signal of the input video signal.

The combiner 340 may combine the first, second and third C signals $C_v(i, j), C_{tv}(i, j)$ and $C_t(i, j)$ using combination coefficients Wv, Wtv and Wt, as represented by Equation 8.

$$C(i,j) = W_v \cdot C_v(i,j) + W_{tv} \cdot C_{tv}(i,j) + W_t \cdot C_t(i,j)$$  [Equation 8]

where Wv, Wtv and Wt are weight coefficients inversely proportional to the vertical variations in the planes illustrated in FIGS. 8, 9 and 10 (or FIGS. 11, 12 and 13). That is, Wv, Wtv and Wt may be weight coefficients respectively representing the reliability of the C signals $C_v(i,j), C_{tv}(i,j)$ and $C_t(i,j)$ obtained from three planes. The appropriate coefficients may be set to large values when vertical variations in the corresponding planes are smaller than vertical variations in the other planes. In other words, a value of a combination coefficient may be determined in accordance with the relative size of the vertical variation in its corresponding data window as compared with other data windows.

For example, the coefficients Wv, Wtv and Wt may be represented as follows.

$$Wv = \frac{Dif(tv) \cdot Dif(t)}{Dif(v) + Dif(tv) + Dif(t)}$$  [Equation 9]

$$Wtv = \frac{Dif(v) \cdot Dif(t)}{Dif(v) + Dif(tv) + Dif(t)}$$

$$Wt = \frac{Dif(v) \cdot Dif(tv)}{Dif(v) + Dif(tv) + Dif(t)}$$

In Equation 9, Dif(v), Dif(tv) and Dif(t) are vertical differences in the planes illustrated in FIGS. 8, 9 and 10 (or FIGS. 11, 12 and 13), respectively, and are identical to Difv of Equation 7. Specifically, in the NTSC system, Difv of Equation 7 is identical to Dif(v) of Equation 9 for the plane illustrated in FIG. 8, Difv of Equation 7 is identical to Dif(tv) of Equation 9 for the plane illustrated in FIG. 9 and Difv of Equation 7 is identical to Dif(t) of Equation 9 for the plane illustrated in FIG. 10. In the PAL system, Difv of Equation 7 is identical to Dif(v) of Equation 9 for the plane illustrated in FIG. 11, Difv of Equation 7 is identical to Dif(tv) of Equation 9 for the plane illustrated in FIG. 12 and Difv of Equation 7 is identical to Dif(t) of Equation 9 for the plane illustrated in FIG. 13.

As described above, Y/C separation may be performed in a desired direction having the highest correlation in the spatio-temporal domain according to the combination coefficients Wv, Wtv and Wt, since the appropriate coefficients are large when the vertical variations in the corresponding planes are smaller than the vertical variations in the other planes. Furthermore, the first through third C signals $C_v(i, j), C_{tv}(i, j)$ and $C_t(i, j)$, respectively separated by the filters 331, 332 and 333, may be calculated using only pixel data having high correlation with the currently processed pixel in respective planes, and thus artifacts generated from the finally separated C signal may be minimized.

Specifically, when the vertical variations in the planes illustrated in FIGS. 9 and 10 (FIGS. 12 and 13) are larger than the vertical variation in the plane illustrated in FIG. 8 (FIG. 11), a relatively large weight may be applied to the first C signal $C_v(i, j)$ according to Equations 8 and 9. When the vertical variations in the planes illustrated in FIGS. 8 and 10 (FIGS. 11 and 13) are larger than the vertical variation in the plane illustrated in FIG. 9 (FIG. 12), a relatively large weight may be applied to the second C signal $C_{tv}(i, j)$. When the vertical variations in the planes illustrated in FIGS. 8 and 9 (FIGS. 11 and 12) are larger than the vertical variation in the plane illustrated in FIG. 10 (FIG. 13), a relatively large weight may be applied to the third C signal $C_t(i,j)$.

The subtracter 350 subtracts the C signal output from the combiner 340 from the currently processed signal CVBS(i, j) to obtain the Y signal, as represented by Equation 4.

As described above, the 3D BPF 330 adaptively carries out comb filtering, 1D band pass filtering and 2D band pass filtering in a continuous manner according to spatio-temporal local characteristics of the input video signal. For example, when the edge direction is fixed vertically, i.e., when the local characteristics of the input video signal indicate high vertical correlation, Wr and Wl becomes small and |Wu| and |Wd| become large, so that the horizontal/vertical filter 331, horizontal/vertical/temporal filter 332 and horizontal/temporal filter 333 perform comb filtering on vertical pixels 1410, 1420 and 1430 (FIG. 14). When the edge direction is fixed horizontally, i.e., when the local characteristics of the input video signal indicate high horizontal correlation, Wu and Wd becomes small and |Wl| and |Wr| become large, so that the filters 331, 332 and 333 perform comb filtering on horizontal pixels 1410, 1440 and 1450 (FIG. 14). In the general case, when the local characteristics of the input video signal indicate high or low correlation in both the horizontal and vertical directions, all the coefficients Wu, Wd, Wl and Wr are determined such that 2D or 3D filtering is performed.

That is, the 3D BPF 330 of the present invention separates the C signal such that a high frequency component of the C signal included in the Y signal may be distinctly extracted in spatio-temporal spectral characteristics of filtering when correlation is high or low in all directions of the spatio-temporal domain, to thereby reduce artifacts. Specifically, using the plane coefficients Wu, Wd, Wl and Wr of Equation 7 to average surrounding pixels stabilizes the signal when correlation is high in all directions. When correlation is low in all directions, the C component may be distinctly separated, minimizing cross-color artifacts, and the RF component of the Y signal may be distinctly extracted.

On the other hand, when correlation is spatio-temporally high in a specific direction, plane coefficients corresponding to the direction become large but plane coefficients corresponding to the other directions become small. Thus, comb filtering or 1D band pass filtering is carried out on pixels surrounding the central pixel to separate Y and C signals, thereby minimizing artifacts.

As described above, in the video signal processing apparatus 300 according to the present invention, the adaptive 3D BPF 330 may perform Y/C separation according to local comb filtering/1D band pass filtering when the edge direction is fixed vertically/horizontally on field-by-field/frame-by-frame basis according to spatio-temporal local characteristics of an image using spatio-temporal filters. When the edge direction is not fixed horizontally/vertically, the 3D BPF 330 may perform 2D band pass filtering in all directions. The 3D BPF may continuously perform comb filtering, 1D band pass filtering and 2D band pass filtering according to the spatio-temporal local characteristics of the image.

While the 3D BPF 330 processes three planes with three filters using the plane coefficients Wu, Wd, Wl and Wr and the combiner 340 applies weights derived from the three combination coefficients Wv, Wtv and Wt have been described in the aforementioned embodiment of the present invention, the 3D BPF can be easily extended to a device having N filters for processing N planes by those skilled in the art.

The video signal processing apparatus according to the present invention adaptively performs local comb filtering/1D band pass filtering or 2D band pass filtering in all directions in a continuous manner according to spatio-temporal local characteristics of an image in the NTSC/PAL systems. Thus, the video signal processing apparatus of the present invention may detect the edge of an image more accurately than a conventional apparatus that discretely selects filtering methods and may produce excellent and stable spectrum characteristics. Accordingly, artifacts, such as cross-luma and cross-color, may be reduced or removed when the video signal processing apparatus of the present invention is applied to a display system, resulting in improvement of display quality of the display system.

Exemplary embodiments of the present invention have been disclosed herein, and although specific terms are employed, they are used and are to be interpreted in a generic and descriptive sense only and not for purpose of limitation. For example, while embodiments of the present invention has been described relative to a hardware implementation, the processing of present may be implemented in software, e.g., by an article of manufacture having a machine-accessible medium including data that, when accessed by a machine, cause the machine to separate the Y and C components. Accordingly, it will be understood by those of ordinary skill in the art that various changes in form and details may be made without departing from the spirit and scope of the present invention as set forth in the following claims.

What is claimed is:

1. A video signal processing method, comprising:
generating a plurality of plane coefficients and combination coefficients using digital data corresponding to a plurality of fields of an input video signal;
convoluting filter masks composed of the plane coefficients with corresponding data windows of the input video signal to produce a first chrominance signal $C_1$, a second chrominance signal $C_2$ and a third chrominance signal $C_3$; and
combining the first, second and third chrominance signals $C_1$-$C_3$ using the combination coefficients to generate a C signal of the input video signal.

2. The method as claimed in claim 1, further comprising subtracting the C signal from the input video signal to obtain a Y signal of the input video signal.

3. The method as claimed in claim 1, wherein convoluting comprises adaptively generating filter masks in a continuous manner according to spatio-temporal local characteristics of the input video signal.

4. The method as claimed in claim 1, wherein convoluting comprises:
local vertical comb filtering when the local characteristics of the input video signal indicate high vertical correlation;
local horizontal band pass filtering when the local characteristics of the input video signal indicate high horizontal correlation; and
2D band pass filtering when the local characteristics of the input video signal indicate high or low correlation in both the horizontal and vertical directions with reference to at least five field data.

5. The method as claimed in claim 1, wherein convoluting comprises:
convoluting a first filter mask composed of a combination of first plane coefficients with a first data window to produce the first chrominance signal $C_1$;
convoluting a second filter mask composed of a combination of second plane coefficients with a second data window to produce the second chrominance signal $C_2$; and convoluting a third filter mask composed of a combination of third plane coefficients with a third data window to produce the third chrominance signal $C_3$.

6. The method as claimed in claim 5, wherein:
the first data window includes digital data of at least three horizontal scan lines of a current field;
the second data window includes digital data of a horizontal scan line of each of a previous field, the current field and a next field; and
the third data window includes digital data of a horizontal scan line of each of a field two fields prior to the current field, the current field and a field two fields after the current field.

7. The method as claimed in claim 6, wherein each of the first, second and third data windows are composed of digital data having a common phase.

8. The method as claimed in claim 7, wherein each of the first plane coefficients, the second plane coefficients and the third plane coefficients includes a first coefficient proportional to vertical and upward correlations with the central pixel, a second coefficient proportional to vertical and downward correlations with the central pixel, a third coefficient proportional to horizontal and leftward correlations with the central pixel, and a fourth coefficient proportional to horizontal and rightward correlations with the current pixel.

9. The method as claimed in claim 1, wherein a value of each combination coefficient is inversely proportional to a relative vertical variation in a corresponding data window.

10. The method as claimed in claim 1, wherein the video signal processing method is applied to an NTSC or PAL system.

11. The apparatus as claimed in claim 1, wherein the filter is applied to an NTSC or PAL system.

12. A video signal processing apparatus, comprising:
a weight determination unit to generate a plurality of plane coefficients and combination coefficients using digital data corresponding to a plurality of fields of an input video signal;
a filter to convolute filter masks composed of the plane coefficients with corresponding data windows of the input video signal to produce a first chrominance signal $C_1$, a second chrominance signal $C_2$ and a third chrominance signal $C_3$; and
a combiner to combine the first, second and third chrominance signals $C_1$-$C_3$ using the combination coefficients to generate a C signal of the input video signal.

13. The apparatus as claimed in claim 12, further comprising a subtracter to subtract the C signal generated by the combiner from the video signal to obtain a Y signal of the input video signal.

14. The apparatus as claimed in claim 12, wherein the filter continuously generates filter masks according to spatio-temporal local characteristics of the input video signal.

15. The apparatus as claimed in claim 12, wherein the filter performs:
local vertical comb filtering when the local characteristics of the input video signal indicate high vertical correlation;
local horizontal band pass filtering when the local characteristics of the input video signal indicate high horizontal correlation; and
2D band pass filtering when the local characteristics of the input video signal indicate high or low correlation in both the horizontal and vertical directions with reference to at least five field data.

16. The apparatus as claimed in claim 12, wherein the filter comprises:
a first filter to convolute a first filter mask composed of a combination of first plane coefficients with a first data window to produce the first signal $C_1$;
a second filter to convolute a second filter mask composed of a combination of second plane coefficients with a second data window to produce the second chrominance signal $C_2$; and
a third filter to convolute a third filter mask composed of a combination of third plane coefficients with a third data window to produce the third chrominance signal $C_3$.

17. The apparatus as claimed in claim 16, wherein:
the first data window includes digital data of at least three horizontal scan lines of a current field;
the second data window includes digital data of a horizontal scan line of each of a previous field, the current field and a next field; and
the third data window includes digital data of a horizontal scan line of each of a field two fields prior to the current field, the current field and a field two fields after the current field.

18. The apparatus as claimed in claim 17, wherein each of the first, second and third data windows are composed of digital data having a common phase.

19. The apparatus as claimed in claim 18, wherein each of the first plane coefficients, the second plane coefficients and the third plane coefficients includes:
a first coefficient proportional to vertical and upward correlations with a current pixel;
a second coefficient proportional to vertical and downward correlations with the current pixel;
a third coefficient proportional to horizontal and leftward correlations with the current pixel; and
a fourth coefficient proportional to horizontal and rightward correlations with the current pixel.

20. The apparatus as claimed in claim 12, wherein a value of each combination coefficient is inversely proportional to a relative vertical variation in a corresponding data window.

* * * * *